United States Patent
Dzierwinski et al.

(10) Patent No.: US 10,063,452 B1
(45) Date of Patent: Aug. 28, 2018

(54) ROUTING LOOP FOR TESTING A COMMUNICATION LINK

(71) Applicant: Amazon Technologies, Inc., Seattle, WA (US)

(72) Inventors: Kevin Michael Dzierwinski, Seattle, WA (US); Girish Anand, Bellevue, WA (US); Travis Steven Pepper, Seattle, WA (US); Kent David Forschmiedt, Shoreline, WA (US); Lisa Huang, Seattle, WA (US); Jacques Joshua Richard, Edmonds, WA (US)

(73) Assignee: Amazon Technologies, Inc., Seattle, WA (US)

( * ) Notice: Subject to any disclaimer, the term of this patent is extended or adjusted under 35 U.S.C. 154(b) by 10 days.

(21) Appl. No.: 14/589,812

(22) Filed: Jan. 5, 2015

(51) Int. Cl.
  *H04J 1/16* (2006.01)
  *H04L 12/26* (2006.01)

(52) U.S. Cl.
  CPC .......... *H04L 43/50* (2013.01); *H04L 43/0823* (2013.01); *H04L 43/10* (2013.01)

(58) Field of Classification Search
  None
  See application file for complete search history.

(56) References Cited

U.S. PATENT DOCUMENTS

| | | | | |
|---|---|---|---|---|
| 5,361,372 A * | 11/1994 | Rege | ..................... | H04L 12/433 370/229 |
| 7,190,766 B1 * | 3/2007 | McDonald | .............. | H04M 3/30 379/112.01 |
| 7,457,868 B1 * | 11/2008 | Guo | ..................... | H04L 41/046 709/203 |
| 7,885,204 B1 | 2/2011 | Schongar et al. | | |
| 8,289,845 B1 * | 10/2012 | Baldonado | .............. | H04L 43/16 370/229 |
| 8,547,855 B1 * | 10/2013 | Zingale | ................ | H04L 41/142 370/241 |
| 8,844,041 B1 | 9/2014 | Kienzle et al. | | |
| 9,032,068 B2 * | 5/2015 | Chakrabarti | ............ | H04L 45/70 370/241.1 |
| 9,503,384 B1 * | 11/2016 | Oliveira | ................... | H04L 47/36 |
| 2005/0232227 A1 * | 10/2005 | Jorgenson | ............... | H04L 41/14 370/351 |
| 2005/0243854 A1 * | 11/2005 | Ward | .................... | H04W 24/08 370/437 |
| 2011/0088014 A1 | 4/2011 | Becker et al. | | |
| 2012/0051263 A1 | 3/2012 | Ozawa et al. | | |
| 2014/0068337 A1 | 3/2014 | Rossario et al. | | |
| 2014/0105045 A1 * | 4/2014 | Oh | ........................ | H04W 24/08 370/252 |

(Continued)

*Primary Examiner* — Kwang B Yao
*Assistant Examiner* — Juvena Loo
(74) *Attorney, Agent, or Firm* — Davis Wright Tremaine LLP

(57) ABSTRACT

A method and apparatus for testing a communication link are disclosed. In the method and apparatus, a routing loop is established between two devices connected by the communication link, and data is routed between the two devices over the communication link. One or more performance measures of the communication link are obtained based at least in part on the data routing. The one or more performance measures are then used to determine whether the communication link is defective.

20 Claims, 7 Drawing Sheets

(56) References Cited

U.S. PATENT DOCUMENTS

| | | | |
|---|---|---|---|
| 2014/0112148 A1* | 4/2014 | Flinta | H04L 43/087 370/235.1 |
| 2014/0119221 A1* | 5/2014 | Park | H04L 41/5038 370/252 |
| 2015/0163108 A1 | 6/2015 | Wong et al. | |
| 2015/0188780 A1* | 7/2015 | Spieser | H04L 41/5009 370/252 |
| 2015/0326457 A1* | 11/2015 | Wu | H04L 43/0817 370/252 |
| 2015/0333993 A1* | 11/2015 | Welin | H04L 43/0882 370/252 |

* cited by examiner

ROUTING LOOP FOR TESTING A COMMUNICATION LINK

BACKGROUND

Data center, server farms and other computing environments, often include a large number of networked servers, routers and storage devices, among other types of devices. The devices may be connected using optical fiber or metal wire communication links, whereby the communication links are relied on to carry data between the devices. Because communication links may malfunction or to become defective, it is desirable for the communication links to be tested before being placed into service and while in use. For example, light levels of optical fiber may become dimmed and, thus, less effective at transporting data. In addition, dust particles may obstruct the flow of data. Testing the communication links ensures that the communication links operate as intended, for example, by being capable of carrying the amount of data for which they are rated. Furthermore, the devices or their components may also experience hardware malfunction or software 'glitches' and may, accordingly, be tested.

It is often challenging to test a communication link between devices by configuring a routing loop between the devices. It is also challenging to use the routing loop to expose a flaw or a malfunction in the communication link or the devices.

BRIEF DESCRIPTION OF THE DRAWINGS

Various embodiments in accordance with the present disclosure will be described with reference to the drawings, in which.

DETAILED DESCRIPTION

Figure 1:
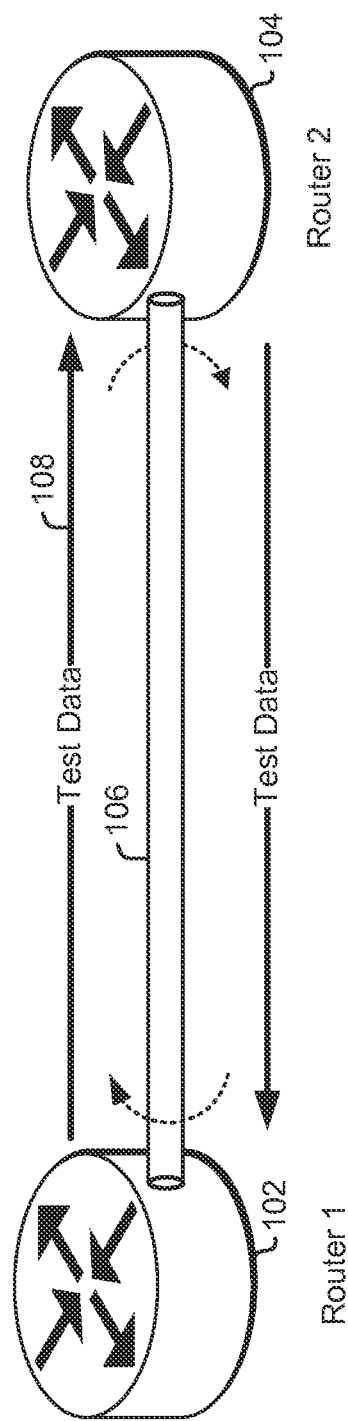
FIG. 1 shows an example of a routing loop test in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include testing a communication link between two devices using an established routing loop between the devices. The communication link may be any type of connection that facilitates communication between the devices, such as an optical fiber or cable wire, among others. The devices may be any type of devices that are capable of receiving or sending data, whereby examples of the devices include networked computers or servers as well as routers, among others. Establishing a routing loop may include configuring both devices with static routes. The first device may be configured with a static route that specifies that the first device is to route to the second device data addressed to a specific destination address. Similarly, the second device may be configured with a static route that specifies that the second device is to route to the first device data addressed to the same destination address. Upon configuring the routing loop between the two devices, data that is addressed to the destination address may be routed back and forth between the devices and traverse the communication link between the devices multiple times. The devices may be configured to monitor received data to identify transmission or communication errors that occurred in the routing of the data or the transmission of the data across the communication link. Furthermore, the devices may be configured to monitor indicia of processing or handling errors by the devices. Occurrence of the processing or handling errors may be indicative of a malfunction or defect of the devices.

To increase the likelihood of exposing and detecting communication link or device defect or malfunction, the size of the data used to test the communication link (also referred to herein as test data) may be increased. For example, the size of the test data or the rate at which the test data is transmitted over the communication link may be set to a maximum size or rate for which the communication link or the devices are rated. Increasing the size of the test data or the rate at which the test data is transmitted over the communication link can be advantageous in that it burdens and stresses both the communication link and the devices and brings about potential defects that may be corrected prior to putting the link or devices into service. For example, dust particles may be present in in optical fibers and hinder their ability to carry data between the devices. If the optical fibers are tested at a low throughput defects in the optical fiber may be less likely to be detected or recognized. Similarly, hardware or software malfunctions or "glitches" may also hinder the operation of the routers by causing buffers be filled prematurely and, therefore, packet data to be dropped. If the devices are tested at throughput levels below those for which they are rated, hardware or software malfunctions may not be exposed or detected.

Following establishment of the routing loop between the device, test data may be routed between the devices at a relatively high throughput and indicia of flaw or malfunction may be observed over the test period. The communication link or the devices may be replaced or repaired as a result of detecting a malfunction. For example, the devices may be configured to maintain various error counters that represent the number of received test data packets with checksum errors or the number of dropped packets due the unavailability of device buffers to store the packets. If one or more error counters are found to exceed a threshold, a device or link malfunction may be identified.

The devices and link may be tested while in service (for example, while also routing data other than test data including user data during the course of their operation). Alternatively, the device or the link may be tested before being put in service or during a pause of being in service. The test data may further be associated with one or more conditions for expiration, such a time-to-live count that represents the number of times that a test data packet is to be routed prior to being discarded or the number of link traversals that are to be made by a test data packer prior to being discarded. If the one or more conditions for traversal are met, the test data may be discarded and may, thus, be no longer routed in a network.

FIG. 1 shows an example of a routing loop test in accordance with at least one embodiment. Two routers are shown in FIG. 1 (denoted as router 1 and router 2 and referred to herein as a first router 102 and second router 104, respectively) to be connected via a communication link 106. The routers 102, 104 may each receive data and forward the data to a receiving device. For example, the routers 102, 104 may be used in a network to forward data, such Internet protocol (IP) packet data, along a routing path to destination devices. The communication link 106 connecting the routers 102, 104 may be any type of connecting medium, such as optical fiber or metal wire. A routing loop may be established between the two routers 102, 104, whereby each router 102, 104 may be configured to forward data that is addressed to a destination address to the other router 102, 104.

To test the communication link 106, a router 102, 104 obtains test data 108, whereby obtaining the test data may include generating the test data 108. The test data 108 may be a unit of information in a packet switched network, such as a datagram or data packet addressed to the destination address. The routers 102, 104 may route the test data 108 in accordance with their configuration between one another over the communication link 106. While the data 108 get routed between the routers 102, 104, performance measures of the communication link 106 and the routers 102, 104 may be obtained and evaluated to determine whether the communication link 106 or the routers 102, 104 are defective or malfunctioning. The performance measures may include error counters of the routers 102, 104 that count the number of packets of the test data 108 that are identified to have a cyclic redundancy check (CRC) error or the number of packets that are dropped by the routers 102, 104 due to buffer unavailability. The performance measures may be used as indicators of a malfunction of the communication link 106 or misconfiguration of the routers 102, 104, and the communication link 106 or the routers 102, 104 may, accordingly, be repaired or replaced.

Figure 2:
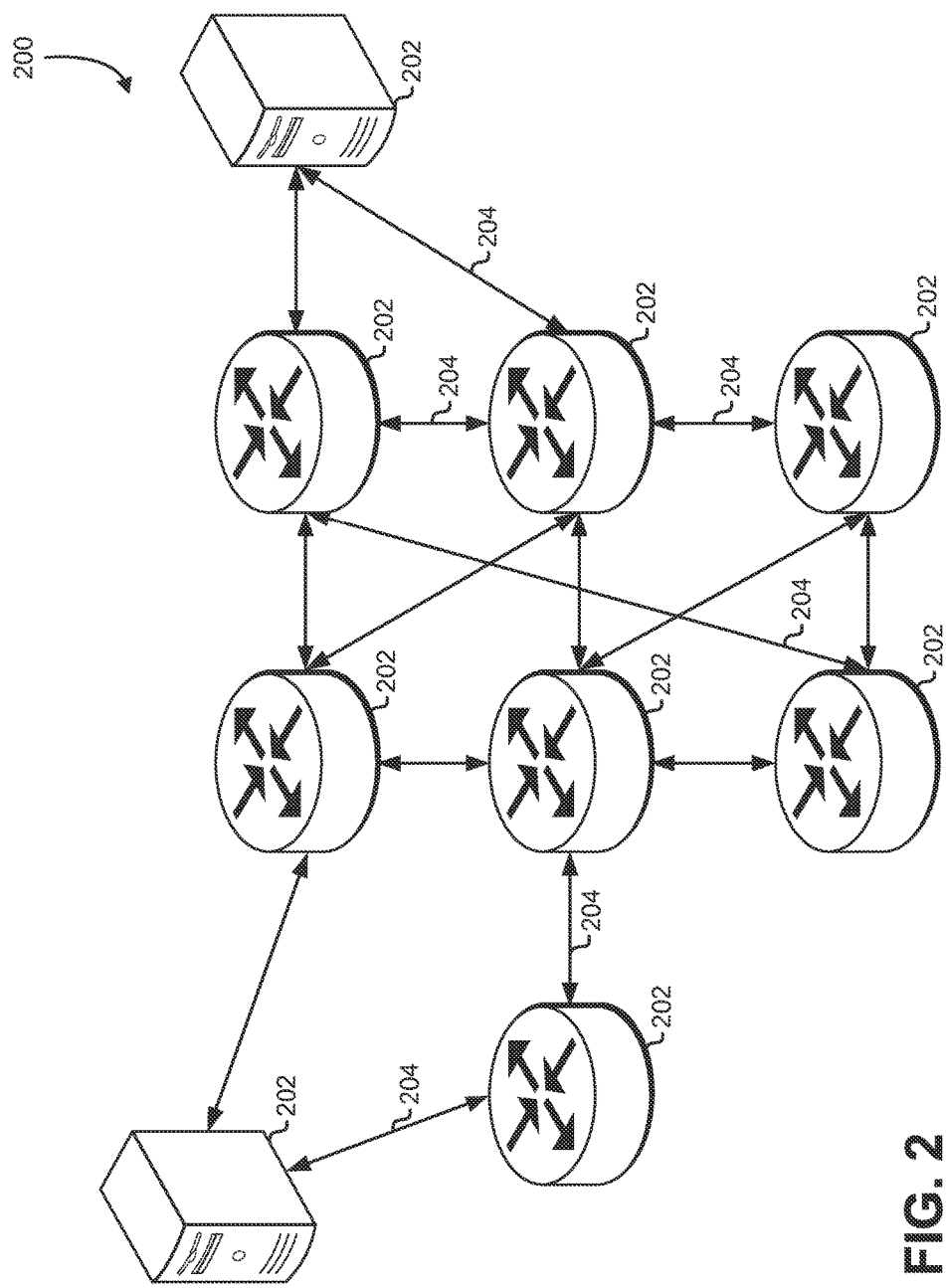
FIG. 2 shows an example of a network having a plurality of connected devices in accordance with at least one embodiment.

FIG. 2 shows an example of a network having a plurality of connected devices in accordance with at least one embodiment. In the network 200, a plurality of devices 202 (singularly referred to herein as device 202) are connected via a plurality of communication links 204 (singularly referred to herein as communication link 204). A device 202 of the network 200 may be any type of device that is configured to send or receive data. For example, a device 202 may be a server, router (also known as a switch) or data storage device, among others. The server may communicate with clients within or outside of the network 200 and may receive requests (for example, application programming interface (API) configured function calls) from the clients, process the requests and respond to the requests. Similarly, a data store may be configured to receive requests for data and retrieve data from storage and provide the data to the requesting party. In addition, if the device 202 is a router, the device 202 may receive data (for example, from a server, data store or another router, among others) and may further route the received data by forwarding the received data to another device 202. A router may be configured with routing tables that are usable to identify a device to which to forward the data based at least in part on a destination address associated with the data. The data may be packetized in accordance with a communications or a routing protocol, whereby a data packet may include fields (such as headers) that specify a destination and source address associated with the data. In addition to the fields or headers, the data packet may include a payload. The payload may be any data portion (for example, a string comprising binary data) and a communication or routing protocol may not dictate a structure of the payload. For example, limits may be imposed on the size of the payload but not on the type or structure of data included in the payload.

The communication link 204 between any two devices 202 of the network 200 may be any type of medium using which data may be sent from a first device 202 to a second device 202 or vice-versa. The communication link 204 may be "wired". Alternatively, in some embodiments, the communication link 204 may be wireless. Examples of a wired communication link 204 include an optical fiber cable or metal wire cable, whereby a metal wire cable may be a copper wire cable. Furthermore, a metal wire cable may be a twisted pair cable or a coaxial cable, among others. The communication link 204 may be used to carry data between a transmitting device 202 and a receiving device 202, whereby the data may be modulated for transmission over the communication link 204.

A variety of physical factors of the communication link 204 affect data throughput over the communication link 204. Furthermore, the physical factors may also affect the observed bit-error rate or packet-error rate over the communication link 204. For example, if the communication link is optical fiber, dust particles that collect in the optical fiber may hinder the ability of optical fiber to carry light-modulated information. Additionally, a break or a misalignment of the optical fiber as well as insufficient light levels may result in reducing the amount of information (for example, a measured in bits per second) that may be carried over the optical fiber. The physical factors may result in the optical fiber or any other type of communication link 204 operating below its rated maximum throughput or error rate.

In data centers or server farms, among others, it is desirable to test the communication links 204 between servers, router and other devices. The testing may be performed before or after the communication links 204 are used or put into service. The testing may aim to expose failures of the communication links 204. Testing the communication links 204 may include transmitting data via the communication link 204 between two devices 202 connected by the communication link 204 at or close to a maximum amount of throughput. The maximum amount of throughput may be an upper bound of the amount of throughput that the communication link 204 may be used to carry during the course of subsequent operation or when the communication link 204 is put into service following the testing phase. The two devices 202 may then be monitored to determine whether errors occurred in the transmission of data between the two devices 202. Furthermore, the operation of the two devices 202 may be monitored in the testing phase to identify whether the devices' 202 hardware components or software fail or malfunction due at least in part to the volume of the data that is trafficked or data loss or data errors.

Transmitting data over the communication link 204 at or near to a maximum throughput can be advantageous due to the fact that the higher throughput is more likely to expose deficiencies in the communication link 204. Whereas transmitting data at a lower rate over the communication link 204 may only partially expose deficiencies in the communication link 204, higher data rates and data volumes increases the magnitude of the manifested deficiencies. Furthermore, increasing the volume and rate of the transmitted data can be advantageous in that it stresses both the communication link 204 and the devices 202 at either end of the link to bring about potential flaws or defects in the communication link 204 and the devices 202.

Figure 3:
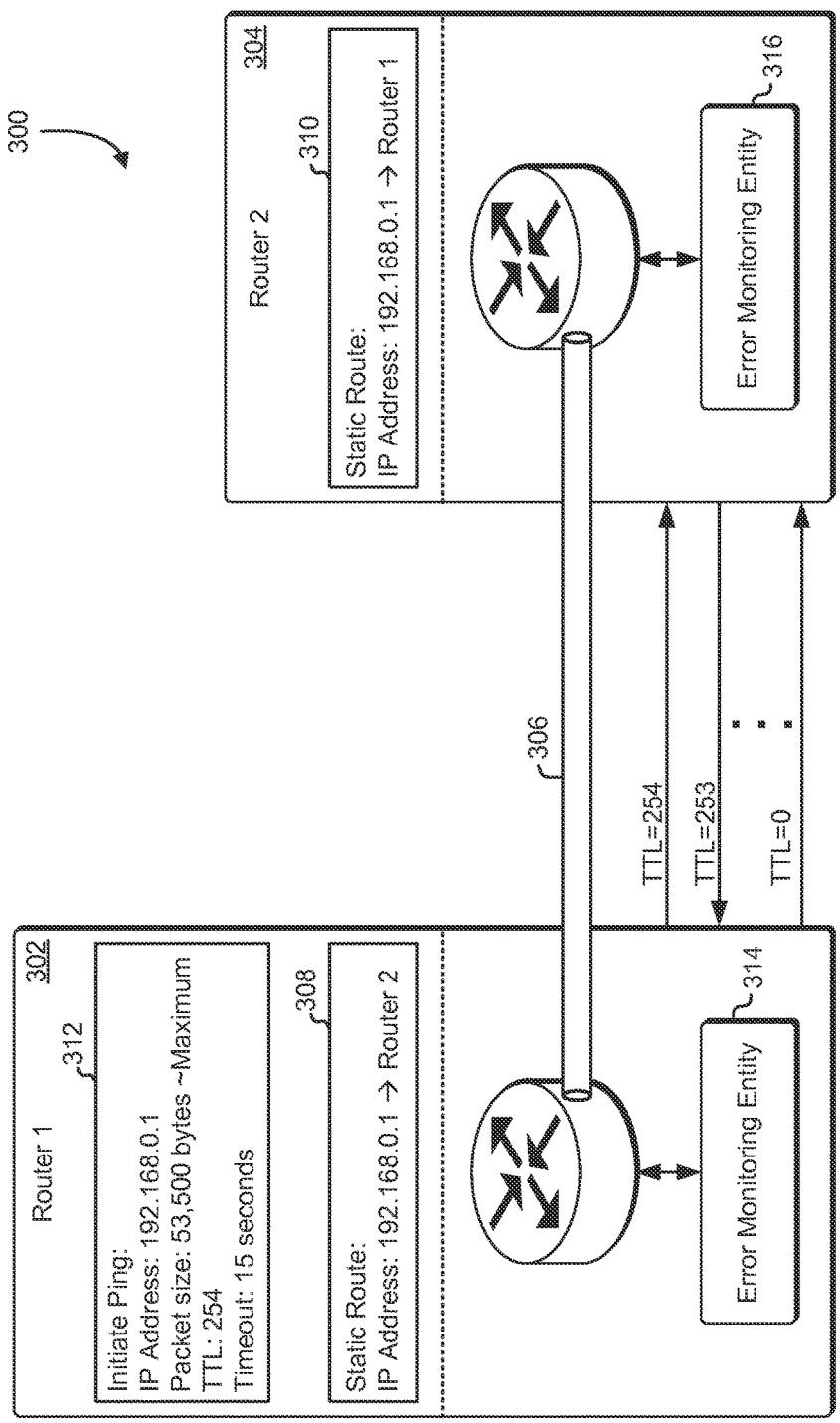
FIG. 3 shows an example of an environment for testing a communication link between routers in accordance with at least on embodiment.

FIG. 3 shows an example of an environment for testing a communication link between routers in accordance with at least on embodiment. A first router (denoted as "router 1" and referred to herein by the numeral '302') and a second router (denoted as "router 2" and referred to herein by the numeral '304') are connected via a communication link 306. Although two routers 302, 304 are shown in FIG. 3, the routers 302, 304 are examples of the devices 202 described with reference to FIG. 2 and any other type of device may be used in alternative embodiments. The routers 302, 304 may be any type of device that is capable of receiving and transmitting data. The routers 302, 304 may receive or generate the data and may send the data to other devices in a network (such as other routers). The routers 302, 304 may also forward data along a routing path in a network. For example, each of the routers 302, 304 may be configured to receive data from a device (such as another router or a server, among others) in a network and inspect the data to determine a destination address of the data. The routers 302, 304 may be configured with routing tables that are used to identify a device (such as another router) to which the data may be forwarded. The data may be propagated further along a routing path in a network. A used herein a router or another type of device may be a physical device or a virtual device that is instantiated using the underlying computing resources of a physical device.

The routers 302, 304 are connected using a communication link 306, whereby the communication link may be optical fiber or a metal wire, among others. The routers 302, 304 may each be configured with a routing table that dictates a destination to which the routers 302, 304 forward received traffic. The routing tables may, for example, associate a destination address, such as a host or network address, with both a routing destination and a weight. The weight may be used to determine the routing destination along the routing path to which a packet addressed to the destination address may be forwarded, whereby the higher the weight the more likely it is that the packet is forwarded to the routing destination. When the routers 302, 304 are in use in the network 300, the routing tables may be used to dynamically route data. When the routers 302, 304 are in use or in a testing phase, the routers 302, 304 may be configured with a static routing loop. The static routing loop enables testing the communication link 306 between the routers 302, 304 as well as potential flaws or defects of the routers 302, 304 that are induced by trafficking a large volume of data over the communication link 306.

The static routing loop between the routers 302, 304 may be established such that a volume of data may be transmitted back and forth between the routers 302, 304 to test the communication link 306 connecting the routers 302, 304. Due to the static routing loop, the data used to test the communication link 306 connecting the routers 302, 304 may not be routed to an external entity. Accordingly, the data used to test the communication link 306 may not burden other entities in the network 300.

The first router 302 and the second router 304 are each configured with a respective static route 308, 310. The static route 308 of the first router 302 specifies that data addressed to a specified address is to be routed to the second router 304. The specified address is the destination address of the data used to test the communication link 306 between the first router 302 and the second router 304. Similarly, the static route 310 of the second router 304 specifies that data addressed to the same address is to be routed to the first router 302. The address may be in a non-routable space and, accordingly, user data may not be affected by the static routing loop. The address may not necessarily be part of a routing table of the routers 302, 304. Further, the address may not necessarily be used as a destination address of user data. For example, the routers 302, 304 may be configured with a dynamic routing configuration for user data, and the dynamic routing configuration (for example, routing tables) may not specify the routing of data addressed to the destination address. Only a statically configured routing table may specify the routing of data addressed to the destination address. Furthermore, the routers 302, 304 may be configured with the static routes 308, 310 in addition to any routing tables that are used during the course of their operation.

In addition to configuring the first router 302 and the second router 304 with their respective static routes 308, 310, either router 302, 304 may be configured to generate test data 312. The test data 312 may be any data portion (for example, comprising a plurality of bits, bytes or packets). The test data 312 may be randomly generated, for example, using a pseudo-random number generator. Furthermore, the test data 312 may be a string of binary zeros or ones. In addition, as an alternative to configuring the first router 302 or the second router 304 to generate the test data 312 for using in testing the communication link 306, the test data 312 may be provided to either router 302, 304. The test data 312 may be generated by a different entity than the first router 302 or second router 304 and provided to either router 302, 304. The test data 312 may be stored in a data store (for example, a database) and provided to either router 302, 304.

In FIG. 3, the test data 312 is shown as a ping that is generated by the first router 302. The test data 312 is also shown to be addressed to an Internet protocol (IP) address that the static routing loop established between the two routers 302, 304 is configured to route. The Internet protocol address serves as the destination address of the test data 312. The test data 312 is also associated with a packet size. The packet size may specify the number of bits or bytes of the payload of each packet of test data 312. For example, each packet of test data 312 may have a payload including 53,500 bytes of zero binary data. The test data 312 is also shown as being associated with one or more conditions for expiration. When the one or more conditions for expiration are met, the test data 312 may be discarded, for example, by either router 302, 304. The one or more conditions for expiration may be temporal conditions or non-temporal conditions, such as a routing count. The one or more conditions may include a time-to-live condition as shown in FIG. 3, and the time-to-live condition may represent the number of times that the test data was routed (also known as a 'hop count' representing the number of times the data traverses a communication link). Each time that the test data 312 is routed, a time-to-live count is decremented (or incremented) until a limit is reached. If the time-to-live count is decremented and reaches zero, the test data 312 may be discarded.

In addition, the test data 312 may be associated with one or more conditions for ceasing transmission of the test data 312. The one or more conditions for ceasing transmission are shown in FIG. 3 to include a timeout condition. The timeout condition may specify a length of time during which a router 302, 304 initiates the transmission of test data 312. Initiating the transmission of test data 312 may be distinguished from routing already transmitting test data 312. For example, transmitted test data 312 may continue to be routed in the routing loop until the one or more conditions for expiration are met. Conversely, test data 312 may continually be feed over the communication link 306 so long as the one or more conditions for ceasing transmission of the test data 312 are not met. Once the one or more conditions for ceasing transmission of the test data 312 are met, the test data 312 is no longer transmitted over the communication link 306. Data that is already transmitted prior to the one or more conditions for ceasing transmission being met continues to be routed in the routing loop until its associated one or more conditions for expiration are met. When the one or more conditions for expiration are met, the test data 312 is discarded. Discarding the test data 312 may occur after the one or more conditions for ceasing transmission are met.

Upon obtaining the test data 312 (for example, by generating the test data 312 or receiving the test data 312 from another entity), the first router 302 may evaluate the test data 312 to identify a routing destination for the test data 312. Evaluating the test data 312 may include identifying the destination address of the test 312. Further, evaluating the test data 312 may also include determining based at least in part on the destination address and a routing configuration of the first router 302 a routing destination for the test data 312. The routing configuration of the first router 302 includes the static route 308 with which the first router 302 is configured and any other routing tables of the first router 302. For routing efficiency and so as not to modify the configured operation of the first router 302 beyond adding the static route 308, the test data 312 may not be categorized as warranting a specialized, unique or individualized treatment. That is, the first router 302 and the second router 304 may not distinguish between the test data 312 and other data that is routed in the network 300. For example, if the test data 312 is Internet Control Message Protocol (ICMP) data, the routers 302, 304 may evaluate and route the test data 312 similarly as other ICMP data.

The first router 302 may determine that the static route 308 dictates that the test data 312 is to be routed to the second router 304. Consequently, the first router 302 routes the test data 312 to the second router 304 over the communication link 306 between the routers 302, 304. It is noted that the first router 302 may be configured with an interface to the communication link 306 and the static route 308 may specify that data addressable to the test data's 312 destination address is to be send over the interface. The test data 312 may be received by the second router 304, and the second router 304 may evaluate the test data similarly as the first router 302. The static route of the second router 304 specifies that data addressed to the destination address of the test data 312 is to be routed to the first router 302. Accordingly, the second router 304 routes the test data 312 over the communication link 306 to the first router 306.

Depending on whether the communication link 306 is full-duplex or half-duplex, the communication link 306 may have separate and independent channels for carrying the test data 312 between in either direction between the first router 302 and the second router 304. For example, if the communication link 306 is a full-duplex optical fiber, the communication link 306 may have a first set of optical fiber for carrying data from the first router 302 to the second router 304 and a second set of optical fiber for carrying data from the second router 304 to the first router 302. Conversely, if the communication link 306 is half-duplex, data may only be carried in one direction at a time.

Following routing the test data 312 by the second router 304 to the first router 302, the first router 302 may route the test data 312 back over the communication link 306 to the second router 304 based at least in part on the static route 308 with which the first router 302 is configured. Due to the static routing loop, the test data 312 is trafficked between the routers 302, 304 until the one or more conditions for expiration of the test data 312 are met. When the one or more conditions for expiration are met, the test data 312 may be discarded by a receiving router. As shown in FIG. 3, the time-to-live count of the test data 312 is decremented each time the test data 312 is routed until the one or more conditions for expiration are met (e.g., a time-to-live of zero) at which point the test data 312 is discarded.

As described herein, sending the test data 312 continually and in relatively high volume over the communication link 306 burdens and pressures the physical resources of the communication link 306. Furthermore, flaws or defects of the communication link 306 that escape detection at lower throughputs are more likely to surface and become detectable when the communication link 306 is stressed. Trafficking the test data 312 between the routers 302, 304 is also advantageous in that it exposes potential malfunctions or flaw in the routers 302, 304. For example, if a router 302, 304 malfunctions due to the volume of received or routed data, the malfunction may become detected. The router 302, 304, for example, due at least in part to hardware component impairment or a software "glitch" or "bug", may not operate as designed and expected. Various types of malfunction of the routers 302, 304 may be detected when using the routing loop. Examples of router 302, 304 errors include buffer overruns as well as dropped packets due at least in part to buffer unavailability, among others.

Each router 302, 304 is shown in FIG. 3 to include a respective error monitoring entity 314, 316. The error monitoring entity 314, 316 may an application that is executed on a router 302, 304. In some embodiments, the error monitoring entity 314, 316 may application-specific hardware. The error monitoring entity 314, 316 may monitor received or routed test data 312. Further, the error monitoring entity 314, 316 may be configured to provide one or more indicators of whether the test data 312 meets specified conditions. For example, the error monitoring entities 314, 316 may determine a number of cyclic redundancy check (CRC) errors in the test data 312. The CRC errors may be checksum errors. A checksum error may be found when the sum of bits of a packet of test data 312 is different than an expected sum, whereby the expected sum may be calculated prior to transmission and provided in a field of the packet; alternatively, instead of summing the bits, a checksum can be calculated using a combination of XOR and shift operations on the bits. The error monitoring entities 314, 316 may count the number of observed CRC errors or checksum errors when routing the test data 312 over the routing loop.

The error monitoring entities 314, 316 may be also configured to count the number of packets of test data 312 with an alignment errors, the number of incoming packet collisions, or the number of received overrun packets, among others. The counters of the error monitoring entities 314, 316 may be incremented (assuming errors occur) when the routing loop test is performed. During or after the conclusion of the test, the counters of the error monitoring entities 314, 316 may be evaluated to determine whether the routers 302, 304 malfunctioned or whether manifestations of flaws of the communication link 206 were exhibited. For example, thresholds for the number of errors may be set, and if the number of errors that are counted exceeds a threshold, communication link 206 or router 302, 304 failure or malfunction may be determined to have occurred. The routers 302, 304 or the communication link 206 may be replaced or repaired based at least in part on the number of observed errors.

Figure 4:
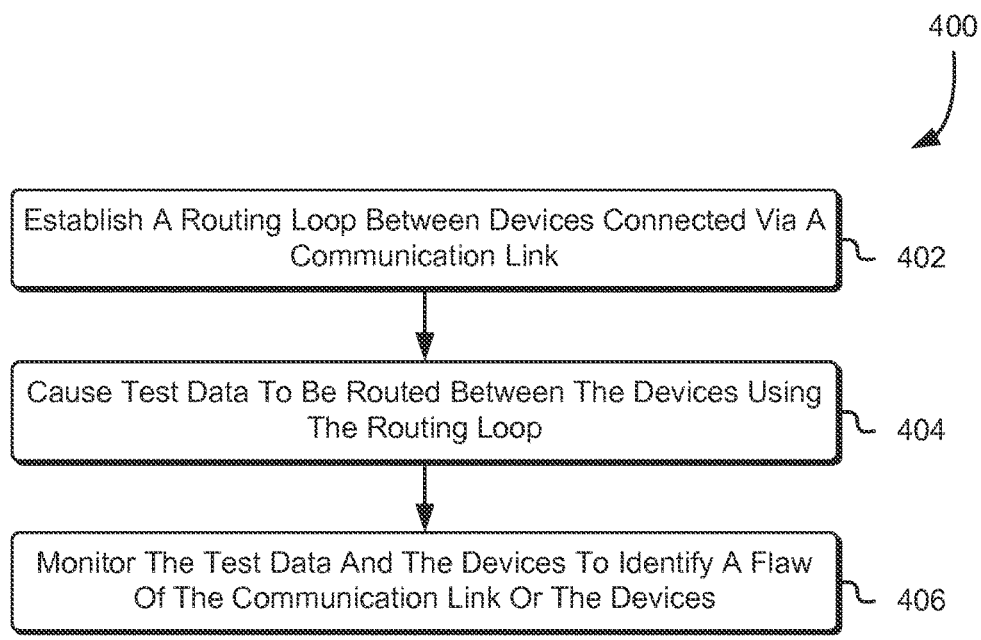
FIG. 4 shows an example of a method for testing a communication link in accordance with at least one embodiment.

FIG. 4 shows an example of a method for testing a communication link in accordance with at least one embodiment. In the process 400, a routing loop is established 402 between devices connected via a communication link. Establishment of the routing loop may be performed using an administrator terminal, which may, for example, be a computer system. The administrator terminal may be configured to communication with both devices and may be used to configure both devices with a static route as described herein. The administrator terminal is then used to cause 404 test data to be routed between the devices using the routing loop. The test data may be generated by either device and may be routed in accordance with the configured static route to the other device. Initially transmitting the test data may include sending an ICMP ping to the other device, whereby the ping may be addressed to a destination address. The static routes of both may specify that packet data addressed to the destination address it to be routed back to the other counterpart device.

The test data and the devices are then monitored 406 to identify a flaw of the communication link or the devices. Both routers may be configured to identify whether checksum errors are observed in the test data as the test data is routed back and forth between the devices. Furthermore, buffer overflows or dropped packets due to buffer unavailability may also be identified. The errors may be counted, for example, using counters of the devices. If one or more error counts are found to be within a range, a link or device flaw may be deemed to have occurred. Consequently, a device or a link may be replaced or repaired.

Figure 5:
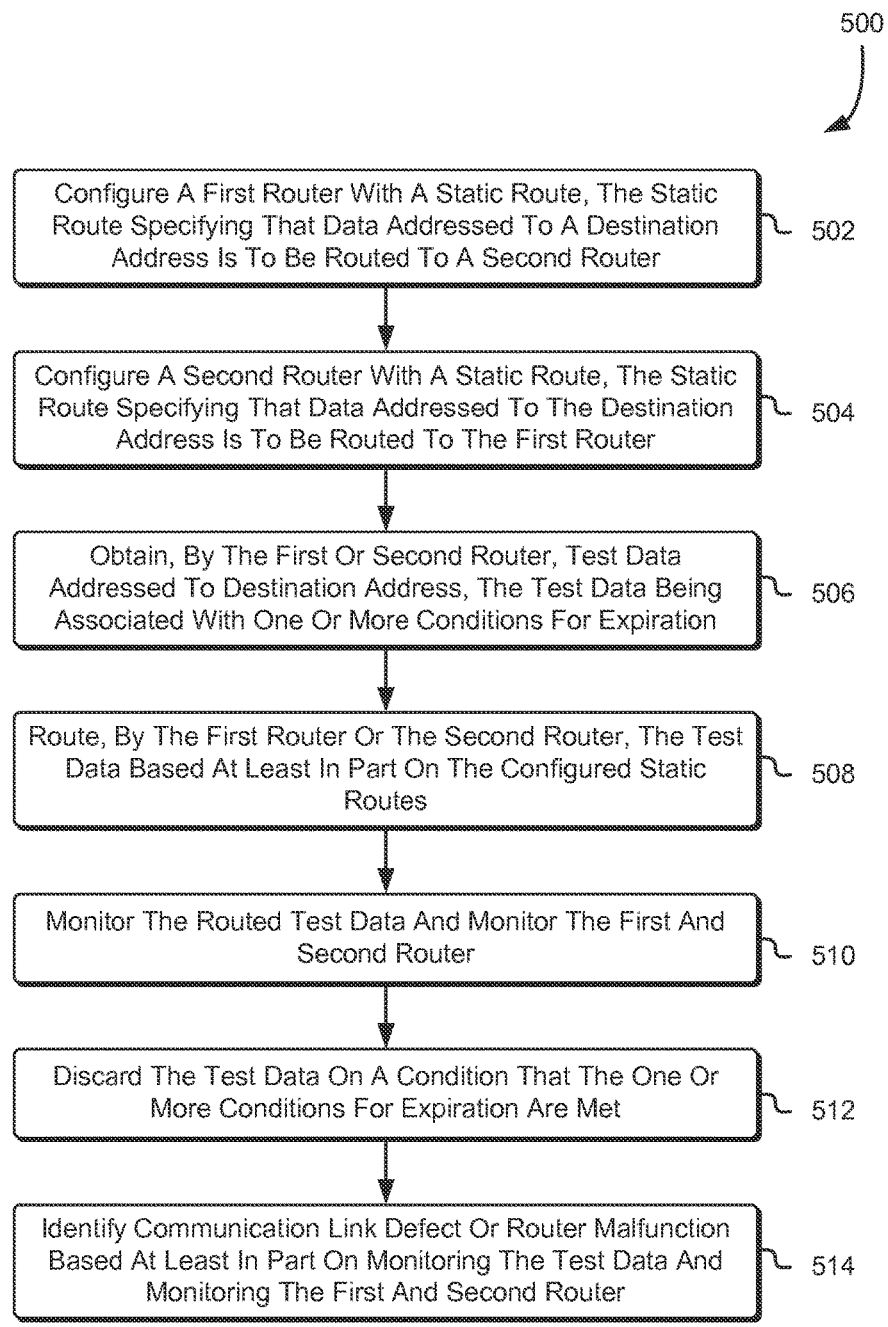
FIG. 5 shows an example of a method for testing a communication link between routers in accordance with at least one embodiment.

FIG. 5 shows an example of a method for testing a communication link between routers in accordance with at least one embodiment. In the process 500, an administrator terminal configures 502 a first router with a static route, whereby the static route specifies that data addressed to a destination address is to be routed to a second router. The administrator terminal then configures 504 a second router with a static route, whereby the static route specifies that data addressed to the destination address is to be routed to the first router.

The first router or the second router then obtains 506 test data that is data addressed to the destination address. The test data may be associated with one or more conditions for expiration. As described herein, the one or more conditions for expiration may include a maximum time-to-live count representing the maximum number of times that the test data is routed before being discarded. The first router or the second router then routes 508 the test data based at least in part on the configured static routes. The first router and the second router then monitor 510 the routed test data. Monitoring the routed test data may include determining whether checksum errors of the test data occurred. Furthermore, monitoring the routed test data may include determining whether alignment errors or packet collisions, among others, have occurred while the data is routed between the first router and the second router. Monitoring the routed test data may include maintaining a count of the errors. Some routers may be natively configured to keep error counts during the course of their operation. The static routing loop may be configured in conjunction with the native configuration. For example, error counters may be captured both prior to commencing the routing loop test by transmitting test data over a communication link and after the test is completed and the test data is discarded. The difference in the captured error counters may be indicative of errors induced by the test.

Furthermore, the first router and the second router are also monitored to determine whether the routers malfunctioned or operated in a manner that is different than expected. Monitoring the first router and the second router may include determining whether data received, transmitted or routed by the routers was mishandled or inappropriately processed or routed. As described herein, some routers are natively configured to monitor their own performance and maintain a count of errors that occur during the course of their operation. Monitoring the routers may include maintaining a count of the number of overruns of the buffers of each counter. In addition, monitoring the routers may include maintaining a count of the number of dropped packets due at least in part to the unavailability of buffers of the routers, among others. The larger the number of buffer overruns of a router, the more likely it is that the router does not have the needed capacity to handle routed test data.

The first router or the second router then discards 512 the test data on a condition that the one or more conditions for expiration are met. For example, if the first router or the second router may be configured to continually monitor received test data to determine whether the one or more conditions for expiration are met. Monitoring the test data ensures that a network is not burdened with data for which a destination is not found. For example, all packet data in a network may be required to be discarded on a condition that the data was routed more than 255 times. Because the test data may be an ICMP ping, the may be rate controlled using an access control list (ACL) of the first router or the second router. The access control list may dictate that ICMP packets by a receiving component of the routers (such as an application-specific integrated circuit (ASIC) of the routers). The ICMP packets may, accordingly, not be forwarded from the receiving component to a processor of the routers (such as a central processing unit (CPU)), thus, reserving computing resources of a router's processor.

A communication link defect or router malfunction may then be identified 514 based at least in part on monitoring the test data and monitoring the first and second router. As described herein, a number of errors that are counted during the implementation of the test may be used to determine whether a communication link defect or router malfunction is deemed to have occurred. Various thresholds may be set for the counted errors may be set and if the number of errors counted meets or exceeds one or more of the thresholds a communication link defect or router malfunction may be identified.

Figure 6:
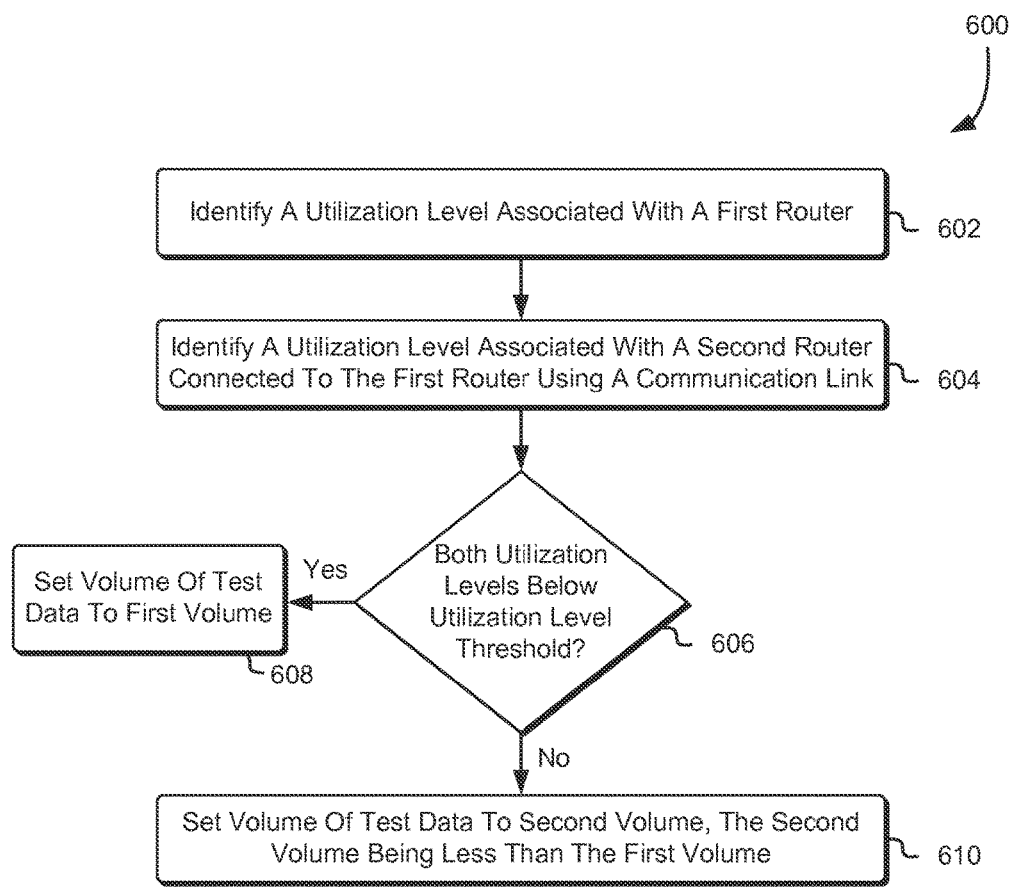
FIG. 6 shows an example of a method for determining a volume associated with test data in accordance with at least one embodiment.

FIG. 6 shows an example of a method for determining a volume associated with test data in accordance with at least one embodiment. In the process 600, an administrator terminal identifies 602 a utilization level associated with a first router. The utilization level may indicate a volume of data presently routed by the first router or an average of volume routed over a period of time. If the first router is in use for routing traffic in a network the first router may be associated with a higher utilization level than if the first router has not been put to service yet. Similarly, the administrator terminal identifies 604 a utilization level associated with a second router connected to the first router using a communication link. For example, if the two routers have not been put into service yet and are connected by the link for the purpose for testing the link and the router, the utilization levels associated with the routers may be at a lowest level. Conversely, if the routers are in use a network to route user data, the routers may have a higher utilization level.

A utilization level threshold may be specified. If the utilization levels associated with both routers are below the threshold, the volume of test data trafficked between the routers to test the communication link may be increased without interfering with the routing of user data. Conversely, if the utilization levels are above the utilization level threshold, then increasing the volume of test data may adversely impact (for example, by delaying) the routing of user traffic or other network traffic. If it is determined 606 that both utilization levels are below a utilization level threshold, then the volume of test data is set 608 to a first volume. However, if it is determined 606 that both utilization levels are not below a utilization level threshold, then the volume of test data is set 610 to a second volume, whereby the second volume of the test data is less than the first volume.

Figure 7:
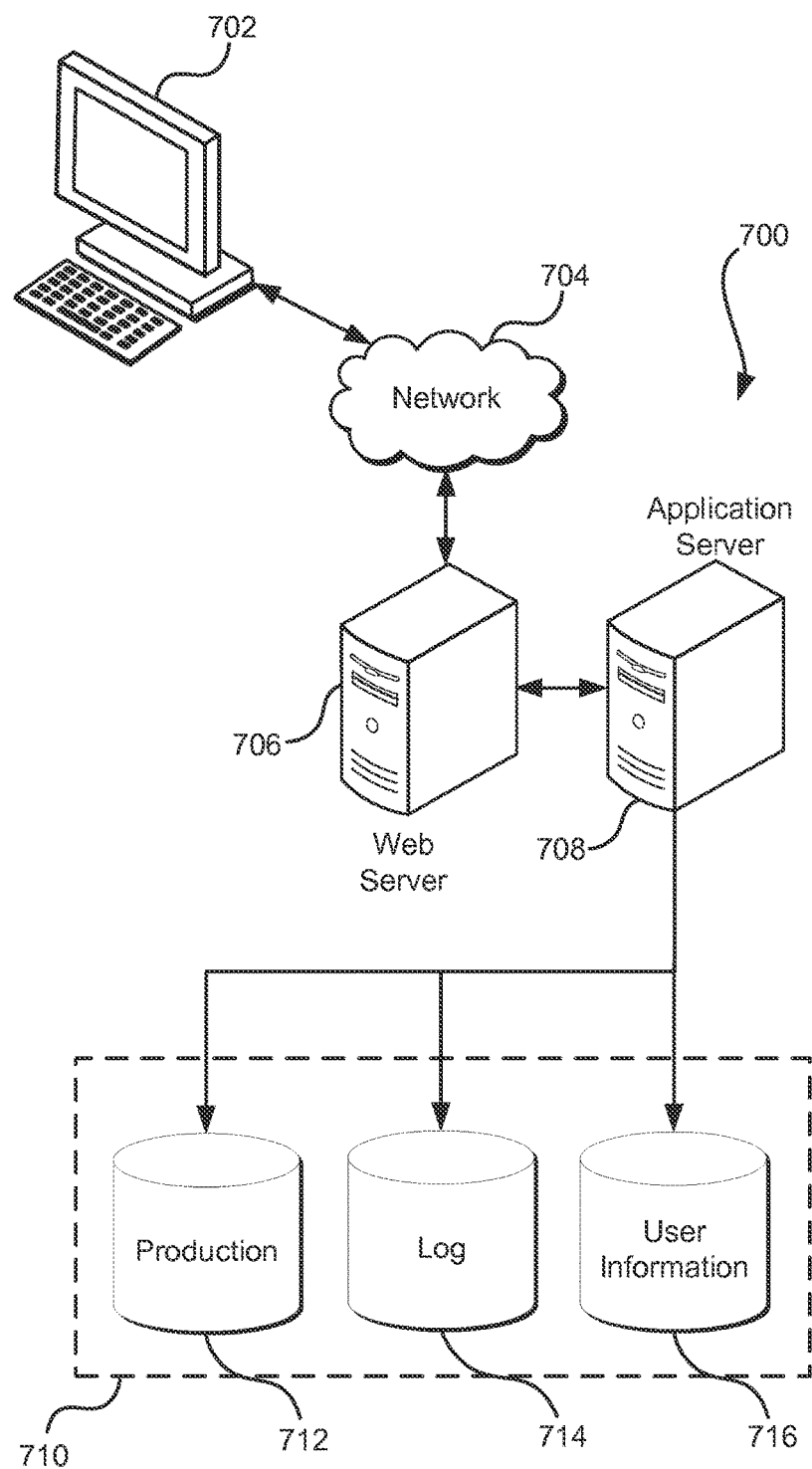
FIG. 7 illustrates an environment in which various embodiments can be implemented.

FIG. 7 illustrates aspects of an example environment 700 for implementing aspects in accordance with various embodiments. As will be appreciated, although a web-based environment is used for purposes of explanation, different environments may be used, as appropriate, to implement various embodiments. The environment includes an electronic client device 702, which can include any appropriate device operable to send and/or receive requests, messages or information over an appropriate network 704 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 702 and the application server 708, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 710 can include several separate data tables, databases, data documents, dynamic data storage schemes and/or other data storage mechanisms and media for storing data relating to a particular aspect of the present disclosure. For example, the data store illustrated may include mechanisms for storing production data 712 and user information 716, which can be used to serve content for the production side. The data store also is shown to include a mechanism for storing log data 714, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. The application server 708 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 702. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method for testing communication links, comprising:
   establishing a routing loop between a first router and a second router by at least:
      configuring the first router with a first static route, the first static route specifying that a data packet addressed to a destination address is to be routed over a communication link to the second router; and
      configuring the second router with a second static route, the second static route specifying that the data packet addressed to the destination address is to be routed over the communication link to the first router;
   as a result of establishing the routing loop, causing a datagram addressed to the destination address to traverse the routing loop two times such that a data rate of the datagram traversing the routing loop is based at least in part on a maximum data rate for which the communication link is rated, the datagram having a condition for expiration indicating a number of traversals of the routing loop to be made by the datagram prior to being discarded, the datagram traversing the routing loop in accordance with the indicated number of traversals; and evaluating one or more performance measures obtained by the first router or the second router to determine whether the communication link malfunctioned, the one or more performance measures being based at least in part on monitoring the datagram traversing the communication link.

2. The computer-implemented method of claim 1, wherein:
the one or more performance measures include a set of error counters; and
an error counter of the set of error counters records a number of checksum errors of the datagram.

3. The computer-implemented method of claim 2, further comprising determining, as a result of the error counter of the set of error counters exceeding a threshold, that the communication link malfunctioned.

4. The computer-implemented method of claim 1, wherein the datagram is generated by the first router or the second router.

5. A system, comprising a first device configured to:
send a datagram addressed to a destination address to a second device over a routing loop, the routing loop comprising a communications link established between a first router and a second router, the sending being based at least in part on a first routing configuration of the first device specifying that data addressed to the destination address is to be routed to the second device;
receive, over the communication link, the datagram from the second device, the datagram being received from the second device over the routing loop as a result of the second device being configured with a second routing configuration specifying the routing loop;
repeat the send and receive steps for two traversals of the routing loop such that a data rate of the datagram traversing the routing loop is based at least in part on a maximum data rate for which the communication link is rated; and
monitor the datagram following each traversal of the routing loop to determine whether the communication link malfunctioned.

6. The system of claim 5, wherein monitoring the datagram includes determining a number of cyclic redundancy check errors of the datagram.

7. The system of claim 5, wherein the first device is further configured to generate the datagram prior to sending the datagram to the second device.

8. The system of claim 5, wherein a size of the datagram is inversely proportional to a utilization level of the first device or the second device.

9. The system of claim 5, wherein:
the datagram is associated with one or more conditions for expiration; and
the datagram is discarded by the first router or the second router on a condition that at least one condition for expiration of the one or more conditions for expiration is met.

10. The system of claim 9, wherein the one or more conditions for expiration include a maximum number of traversals of the routing loop.

11. The system of claim 5, wherein the first routing configuration is a static route configured on the first device.

12. The system of claim 5, wherein monitoring the received datagram further includes determining a number of packets of the datagram dropped as a result of a buffer of the first device being full.

13. A non-transitory computer-readable storage medium having stored thereon executable instructions that, as a result of execution by one or more processors of a first computer system, cause the first computer system to at least:
receive, from a second computer system, a datagram addressed to a destination address;
route the datagram to the second computer system over a routing loop, the routing loop comprising a communication link established between the first computer system and the second computer system, the datagram making two traversals of the routing loop, wherein a data rate of the datagram traversing the routing loop is based at least in part on a maximum data rate for which the communication link is rated;
monitor the datagram following each traversal of the routing loop to obtain one or more performance measures of the communication link; and
determine whether the communication link is malfunctioning based at least in part on the one or more performance measures.

14. The non-transitory computer-readable storage medium of claim 13, wherein the instructions that cause the first computer system to monitor the datagram to obtain the one or more performance measures of the communication link further cause the first computer system to determine a number of checksum errors of the datagram.

15. The non-transitory computer-readable storage medium of claim 13, wherein the routing loop associated with the destination address is established by configuring the first computer system to route a data portion addressed to the destination address to the second computer system and configuring the second computer system to route the data portion addressed to the destination address to the first computer system.

16. The non-transitory computer-readable storage medium of claim 13, wherein the communication link comprises optical fiber or-metal wire.

17. The non-transitory computer-readable storage medium of claim 13, wherein the destination address is not used in a routing table of the first computer system or the second computer system.

18. The non-transitory computer-readable storage medium of claim 13, wherein a size of the datagram is a function of a utilization level of the first computer system or the second computer system.

19. The non-transitory computer-readable storage medium of claim 13, wherein:
the datagram is associated with one or more conditions for expiration; and
the instructions further cause the first computer system to discard the datagram on a condition that at least one condition for expiration of the one or more conditions for expiration is met.

20. The non-transitory computer-readable storage medium of claim 13, wherein the data is an Internet Control Message Protocol (ICMP) ping.

* * * * *